Feb. 6, 1923.

C. E. BARTER 1,444,535

MACHINE FOR REMOVING MEAT FROM PINEAPPLE SHELLS

Filed June 6, 1922     2 sheets-sheet 1

Inventor
CLARENCE E. BARTER.

Feb. 6, 1923.
C. E. BARTER
1,444,535
MACHINE FOR REMOVING MEAT FROM PINEAPPLE SHELLS
Filed June 6, 1922          2 sheets-sheet 2
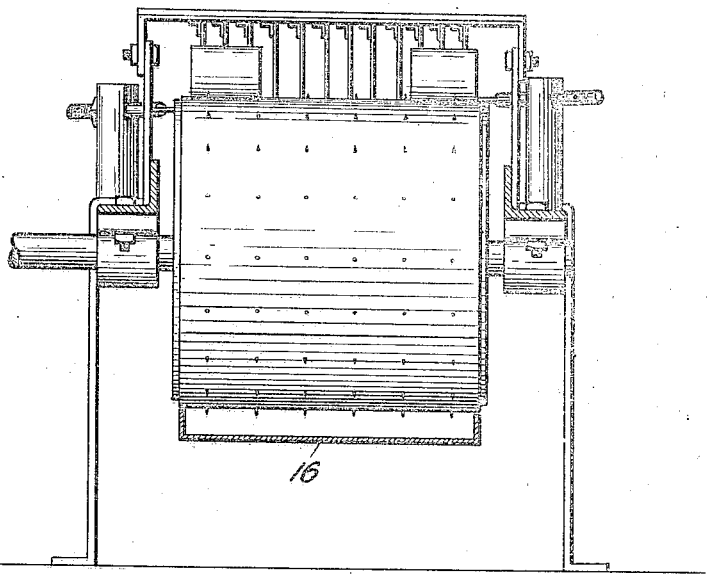
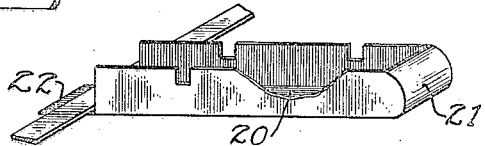
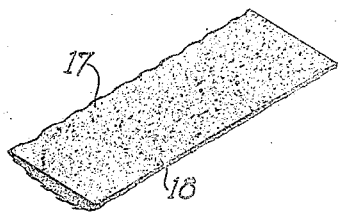
Inventor
CLARENCE E. BARTER
By Dewey, Strong, Townsend & Loftus
Attys Patented Feb. 6, 1923.

1,444,535

UNITED STATES PATENT OFFICE.

CLARENCE E. BARTER, OF HONOLULU, HAWAII, ASSIGNOR TO CALIFORNIA PACKING CORPORATION, OF SAN FRANCISCO, CALIFORNIA, A CORPORATION OF NEW YORK.

MACHINE FOR REMOVING MEAT FROM PINEAPPLE SHELLS.

Application filed June 6, 1922. Serial No. 566,389.

*To all whom it may concern:*

Be it known that I, CLARENCE EVERETT BARTER, a citizen of the United States, residing at the city of Honolulu, Territory of Hawaii, and United States of America, have invented new and useful Improvements in Machines for Removing Meat from Pineapple Shells, of which the following is a specification.

This invention relates to a device to be employed in conjunction with the grid plate of a pineapple meat eradicator, whereby a better and cleaner product may be obtained.

It is common practice in the use of pineapple meat eradicators to feed the pineapple shell into the eradicator by hand; the shell being thrown on the belt meat side uppermost with the longitudinal split side of the shell disposed at right angles to the direction of travel of the belt, thus the ends of the shell assume a position parallel with the sides of the belt and will during the travel of the conveyor pass under the bars of the grid near either side of the eradicator. The ends of the shell are the thinnest portion thereof and contain no meat worth while removing. The ends are often cracked and somewhat broken so that pieces of eyes and shell are carried through the grids and over the knife, in this manner becoming mixed with the clean meat cut from the center of the shell. To remove these pieces of eyes and shell it requires considerable time and labor, and such pieces must be removed as their presence in the clean product reduces in a marked degree the color and quality of the product.

The object of the present invention is to generally improve and simplify pineapple meat eradicators, and especially to provide a pair of grid shoes or deflecting plates whereby the ends of the shell are deflected under the knife and a clean product is thereby obtained, and extra time and labor eliminated.

One form which my invention may assume is exemplified in the following description and illustrated in the accompanying drawings, in which—

Fig. 3 is an end view of the machine partly in section showing the receiving end of the machine.

Fig. 4 is a perspective view of one of the grid shoes showing its position with relation to the slicing blade.

Fig. 5 is a perspective view showing the shape of the shell when removed from the pineapple.

Fig. 6 is a view of the shell after it is split and flattened and in position to be fed to the eradicator.

Figure 1:
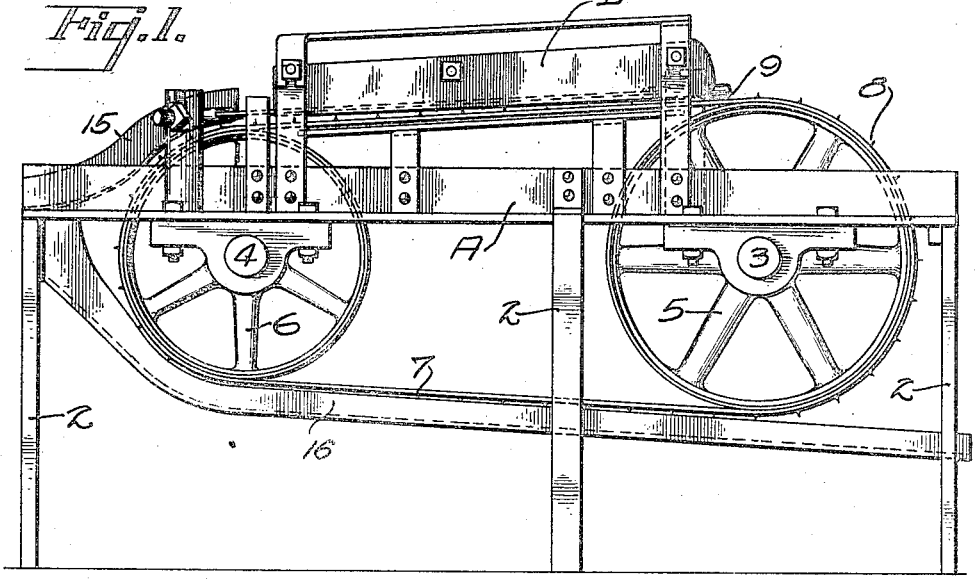
Fig. 1 is a side elevation of a standard form of meat eradicator showing the application of the invention.
Figure 2:
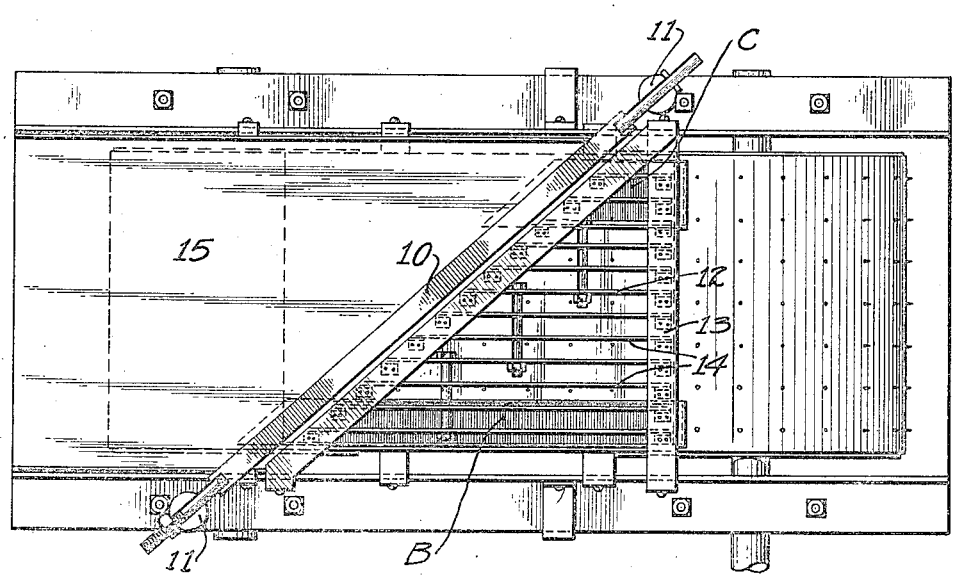
Fig. 2 is a plan view of Fig. 1.

Referring to the drawings in detail, and particularly to Figs. 1 and 2, A indicates the main frame constructed in any suitable manner and supported by legs or standards 2. Journaled crosswise of the frame is a pair of shafts 3 and 4, and secured on the respective shafts are drums or pulleys 5 and 6, respectively, upon which is supported an endless conveyor belt 7. One of the shafts is driven in any suitable manner and a continuous movement is therefore transmitted to the belt when the machine is in operation. The upper surface of the belt is roughened or spiked as indicated at 8 for purposes to be hereinafter described, and the pineapple shells to be eradicated are delivered meat side up to the conveyor or belt 7 at the point indicated at 9. The pineapple shells illustrated in Figs. 5 and 6 are in reality nothing more or less than a by-product of the pineapple canning and preserving industry, that is the center portion of the pineapple is cut out and removed, and it is this portion of the pineapple which reaches the market as a canned product. It happens that considerable meat adheres to the inside of the shell and experience has determined that this meat when removed forms an ideal by-product, which may be treated to produce crushed pineapple or juices and the like. The eradicating machine generally illustrated in Figs. 1, 2 and 3, is employed for the purpose of removing the meat from the shells and this is accomplished in the following manner:

The shells are flattened out, as indicated in Fig. 6, and they are placed meat side up on the conveyor 7, at the point indicated at 9. To efficiently remove the meat it is necessary to flatten out the shell and to hold it in a flattened condition while the meat is being removed, as a slicing knife, generally indicated at 10, is employed for this purpose. This knife is held by a pair of standards 11, positioned one on each side of the frame, and these standards determine the transverse angle of the slicing knife with relation to the travel of the conveyor. The slicing knife is also vertically adjustable in the standards and any thickness of slice desired may in this manner be obtained. For the purpose of flattening out the shell before it reaches the slicing blade or knife 10, a device known as a grid plate is employed; this plate being generally indicated at 12. The grid plate is carried by a cross frame 13 and consists of a series of vertically disposed interspaced bars 14. These bars engage the meat side of the shell and flatten it out, and as the forward ends of the bars are extended to the cutting edge of the blade or knife 10, it can readily be seen that the shell will be perfectly flattened when the knife is reached. The meat is removed in the form of a slice by the blade 10; the meat proper passing over the blade and onto a chute or plate 15 from where it may be removed in any suitable manner. The shell passes under the knife and the plate 15 and is directed into a lower chute 16 from where it may be removed in any suitable manner.

The machine so far described is a standard machine and certain disadvantages are encountered, to-wit, the ends of the shell, indicated at 17 and 18, are very thin and often broken. These ends have a tendency to curl up between the bars 14 of the grid plate as the shell passes underneath the same and a portion of the ends will thus reach the slicing blade in a curled or upturned condition. The ends will thus be sliced off with the clean meat and will mix with the meat on the chute 15. The ends contain portions of the shell and the eyes and such pieces are exceedingly undesirable when mixed with the clean meat as it reduces the quality and color thereof. Heretofore it has been common practice to remove the objectional pieces by hand, and it is obvious that this takes considerable time and labor. In the present instance the objections just referred to have been entirely overcome by the use of grid shoes, such as illustrated in Fig. 4. The grid shoes are in reality nothing more or less than flattened plates 20, the forward ends of which are curled up, as at 21. There is one long grid shoe, as indicated at B, on one side of the grid, and a short grid shoe on the opposite side as shown at C. They are however substantially identical in construction and the base portions 20 thereof pass in under the bars 14 of the grid plate and cover the same. The edges 17 and 18 of the pineapple shell are passed under these grid shoes and are thus prevented from curling up or entering between the bars 14. The plates 20 of the grid shoes are furthermore extended a slight distance under the slicing blade as shown at 22, and the ends are thus held in a flattened and depressed position until the slicing knife has been passed. Pieces of broken shell and eyes are thus deflected under the knife and the chute 15 and a perfectly clean product is obtained.

The grid shoes may be secured to the bars of the grid plate proper, or they may be supported in any other suitable manner; the essential feature being that the grid shoes cover the lower ends of the outermost grid bars to prevent the ends of the shell from entering the same and from curling up at the point where the slicing blade is reached.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or various uses may demand.

Having thus described my invention, what I claim and desire to secure by Letters Patent is—

1. In a machine for removing meat from pineapple shells, a knife, means for delivering a pineapple shell meat side up to the knife, and means for deflecting the edges of the shell in under the knife.

2. In a machine of the class described the combination with a conveyor adapted to receive pineapple shells, of a knife extending transversely across the conveyor, means for retaining the shells in a flattened condition while on the conveyor, and means for deflecting the edges of the shell in under the knife.

3. In a machine of the class described the combination with a conveyor adapted to receive pineapple shells, of a knife extending transversely across the conveyor, means for retaining the shell in a flattened condition while on the conveyor, and a combined cover and deflecting plate disposed above the conveyor and on each side thereof, said plates adapted to deflect the edges of the pineapple shell in under the knife.

4. In a machine of the class described the combination with a conveyor adapted to receive pineapple shells, of a knife extending transversely across the conveyor, means for retaining the shell in a flattened condition while on the conveyor, and a combined cover and deflecting plate disposed above the conveyor and on each side thereof, said plates adapted to deflect the edges of the pineapple shell in under the knife, and said deflecting plates extending in under the knife.

5. In a machine of the class described the combination with a conveyor and a knife extending transversely across the same, of a grid plate disposed above the conveyor in front of the knife, and a grid shoe on each side of the grid plate and covering the bottom portion on each side thereof.

6. In a machine for removing meat from pineapple shells, a conveyor adapted to receive the shells meat side up, means for retaining the shell in a flattened condition when placed on the conveyor, a pair of shoes cooperating with said means and covering the edges of the shell, and a knife disposed forward of said flattening means and said shoes, said shoes extending in under the knife and adapted to deflect the edges of the shell in under the knife.

7. In a machine for removing meat from pineapple shells, a knife, means for delivering a pineapple shell in a flattened condition to the knife, and means for deflecting the edges of the shell below the knife.

8. In a machine for removing meat from pineapple shells, a knife, a conveyor removable with relation to the knife and adapted to receive and support pineapple shells, and means for retaining the shells in a flattened condition when they reach the knife and for deflecting the edges of the shell below the knife.

9. In a machine for removing meat from pineapple shells, a knife, means for delivering the pineapple shell in a flattened condition to the knife, and means for deflecting the edges of the shell and for preventing engagement of the edges with the knife.

CLARENCE E. BARTER.